(12) United States Patent
Kim (10) Patent No.: US 9,680,147 B2
(45) Date of Patent: Jun. 13, 2017

(54) BATTERY HAVING AN ELECTRODE STRUCTURE COMPRISING LONG METAL FIBERS AND A PRODUCTION METHOD THEREFOR

(75) Inventor: Kwonseok Kim, Seoul (KR)

(73) Assignee: JENAX INC., Busan (KR)

( * ) Notice: Subject to any disclaimer, the term of this patent is extended or adjusted under 35 U.S.C. 154(b) by 345 days.

(21) Appl. No.: 13/879,120

(22) PCT Filed: Oct. 19, 2011

(86) PCT No.: PCT/KR2011/007768
§ 371 (c)(1),
(2), (4) Date: Apr. 12, 2013

(87) PCT Pub. No.: WO2012/050407
PCT Pub. Date: Apr. 19, 2012

(65) Prior Publication Data
US 2013/0202960 A1    Aug. 8, 2013

(30) Foreign Application Priority Data

Oct. 16, 2010    (KR) .................. 10-2010-0101139

(51) Int. Cl.
*H01M 4/02* (2006.01)
*H01M 4/04* (2006.01)
(Continued)

(52) U.S. Cl.
CPC .......... *H01M 4/02* (2013.01); *D04H 1/4234* (2013.01); *H01M 4/04* (2013.01); *H01M 4/0402* (2013.01); *H01M 4/64* (2013.01); *H01M 4/661* (2013.01); *H01M 4/74* (2013.01); *H01M 4/806* (2013.01); *Y10T 29/49108* (2015.01); *Y10T 29/49115* (2015.01)

(58) Field of Classification Search
CPC ........ H01M 4/805; H01M 4/134; H01M 4/82; H01M 4/84; H01M 4/661
USPC .................................................. 429/121–347
See application file for complete search history.

(56) References Cited

U.S. PATENT DOCUMENTS

| | | |
|---|---|---|
| 5,080,963 A | 1/1992 | Tatarchuk et al. |
| 5,102,745 A | 4/1992 | Tatarchuk et al. |

(Continued)

FOREIGN PATENT DOCUMENTS

| | | |
|---|---|---|
| CN | 1277466 | 12/2000 |
| CN | 1121731 | 9/2003 |

(Continued)

OTHER PUBLICATIONS

International Search Report mailed Apr. 6, 2012 for PCT/KR2011/007768.

(Continued)

*Primary Examiner* — James Lee (57) ABSTRACT

The present invention relates to a battery having an electrode structure using long metal fibers, and to a production method therefor. According to one embodiment of the present invention, the battery has an electrode structure comprising: an electrically-conductive network which is formed by physical connection or chemical bonding between one or more long metal fibers; and a first electrically active material which is bound to the electrically-conductive network.

10 Claims, 3 Drawing Sheets

(51) Int. Cl.
*H01M 4/66* (2006.01)
*H01M 4/74* (2006.01)
*D04H 1/4234* (2012.01)
*H01M 4/64* (2006.01)
*H01M 4/80* (2006.01)

(56) References Cited

U.S. PATENT DOCUMENTS

| | | | |
|---|---|---|---|
| 5,304,330 | A | 4/1994 | Tatarchuk et al. |
| 2009/0253025 | A1* | 10/2009 | Whitacre ............... H01G 11/06 429/50 |
| 2009/0269677 | A1* | 10/2009 | Hirose et al. ................. 429/338 |
| 2009/0305135 | A1 | 12/2009 | Shi et al. |

FOREIGN PATENT DOCUMENTS

| | | |
|---|---|---|
| CN | 101449409 | 6/2009 |
| JP | 60-148062 | 8/1985 |
| JP | 09-161807 | 6/1997 |
| JP | 10-125332 | 5/1998 |
| JP | 10-162816 | 6/1998 |
| JP | 2007-128724 | 5/2007 |
| JP | 4113593 | 4/2008 |
| JP | 2009-212131 | 9/2009 |
| JP | 2009-537963 | 10/2009 |
| JP | 2009-266473 | 11/2009 |
| JP | 2012-089303 | 5/2012 |
| KR | 10-1999-004383 | 1/1999 |
| KR | 10-2001-0007318 | 1/2001 |
| KR | 10-0368753 | 1/2003 |
| KR | 10-2009-0014304 | 2/2009 |
| KR | 10-2010-0066441 | 6/2010 |
| WO | WO 99-00001 | 1/1999 |

OTHER PUBLICATIONS

Written Opinion of the International Search Report mailed Apr. 6, 2012 for PCT/KR2011/007768.

W. H.Zhu et al., "Nickel-zinc accordion-fold batteries with microfibrous electrodes using a papermaking process" *Journal of Power Sources*, 112 (2002) pp. 353-366.

* cited by examiner

BATTERY HAVING AN ELECTRODE STRUCTURE COMPRISING LONG METAL FIBERS AND A PRODUCTION METHOD THEREFOR

This application claims the priority of Korean Patent Application No. 10-2010-0101139, filed on Oct. 16, 2010 in the KIPO (Korean Intellectual Property Office), the disclosure of which is incorporated herein entirely by reference. Further, this application is the National Stage application of International Application No. PCT/KR2011/007768, filed Oct. 19, 2011, which designates the United States and was published in Korean. Each of these applications is hereby incorporated by reference in their entirety into the present application.

TECHNICAL FIELD

The present invention relates to a battery technology, and more particularly, to a battery including an electrode structure using long metal fibers and a method of manufacturing the battery.

BACKGROUND ART

As a semiconductor manufacturing technology and a communication technology have recently been developed, the mobile electronic device industry has expanded, and demands for environmental preservation and development of alternative energy due to resource depletion have increased, batteries have been actively studied. Since lithium primary batteries which are representative batteries have a higher voltage and higher energy density than conventional aqueous batteries, the lithium primary batteries may be easily made compact and light and thus are widely used. Such lithium primary batteries are mainly used as main power supply sources of mobile electronic devices or backup power supply sources.

Secondary batteries are rechargeable batteries formed of an electrode material having high reversibility. The secondary batteries are classified into cylindrical secondary batteries and polygonal secondary batteries according to outer appearances, and classified into nickel/metal hydride (Ni-MH) secondary batteries, lithium (Li) secondary batteries, and lithium-ion (Li-ion) secondary batteries according to anode and cathode materials. Devices to which secondary batteries are applied have been diversified from small devices such as mobile phones, notebooks, and mobile displays to medium and large devices for electric vehicles and hybrid vehicles. Accordingly, batteries are required to have high stability and cost effectiveness as well as lightweight design, high energy density, high charge/discharge speed, high charge/discharge efficiency, and excellent cycle characteristics.

DISCLOSURE OF THE INVENTION

Technical Problem

The present invention provides a battery including an electrode structure which has high energy density, high charge/discharge efficiency, charge/discharge speed, and excellent cycle characteristics and whose shape and capacity may be easily adjusted.

The present invention also provides a method of manufacturing the battery.

Technical Solution

According to an aspect of the present invention, there is provided a battery including an electrode structure, the battery including: a conductive network that is formed by making one or more metal fibers physically contact or chemically bonded to one another; and a first electrically active material that is bound to the conductive network.

The long metal fibers may have a nonwoven structure in which the long metal fibers are randomly arranged to be coupled to one another. A second electrically active material may be pre-coated on surfaces of some or all of the long metal fibers. The long metal fibers may be formed of two or more different types of metals.

The electrode structure is thermally treated at a temperature ranging from 100° C. to 1200° C. The electrode structure may have a planar shape by being compressed or a deformed shape by bending, winding, and/or stacking the planar shape.

Each of the long metal fibers may have a thickness ranging from 1 μm to 200 μm. Each of the long metal fibers may have a length ranging from 5 mm to 1000 mm. Each of the long metal fibers may include stainless steel, aluminum, nickel, titanium, copper, an alloy thereof, or a combination thereof.

According to another aspect of the present invention, there is provided a method of manufacturing a battery, the method including: providing a first long fiber layer including one or more long metal fibers that have plasticity and physically contact or are chemically bonded to one another; disposing an electrically active material layer on the first long fiber layer; disposing a second long fiber layer on the electrically active material layer, the second long fiber layer includes one or more long metal fibers that have plasticity and physically contact or are chemically bonded to one another; and forming a conductive network in which the first long fiber layer and the second long fiber layer are connected to each other, and binding an electrical material constituting the electrically active material to the conductive network.

The long metal fibers may be randomly arranged to be coupled to one another. The method may further include compressing the first long fiber layer and the second long fiber layer such that the first long fiber layer and the second long fiber layer physically contact or are chemically bonded to each other. The method may further include thermally heating a resultant structure at a temperature ranging from 100° C. to 1200° C.

According to another aspect of the present invention, there is provided a method of manufacturing a battery, the method including: providing long metal fibers that are segmented; providing an electrically active material as particles; forming a mixed composition of the long metal fibers and the electrically active material; and hardening the mixed composition.

The mixed composition may further include at least one of a binder and a conductor. The method may further include thermally heating the mixed composition.

Advantageous Effects

According to the one or more embodiments of the present invention, since an electrode structure is formed by using long metal fibers that have excellent mechanical and thermal characteristics which a metal has and shapability and a structure which a fiber has, contact resistance between a current collector and an electrically active material may be reduced and a contact area may be increased, thereby improving energy density, charge/discharge speed, charge/discharge efficiency, and cycle characteristics of a battery.

Also, since a conductive network of long metal fibers forms appropriate pores, a process of impregnating an electrolyte may be facilitated, flexible response to a change in a shape and a volume of the battery during charging/discharge may be ensured, a process of manufacturing the battery may be simplified through thermal treatment, and the lifetime of the battery may be greatly extended.

MODE FOR CARRYING OUT THE INVENTION

The present invention will now be described more fully with reference to the accompanying drawings, in which exemplary embodiments of the invention are shown.

The present invention now will be described more fully hereinafter with reference to the accompanying drawings, in which elements of the invention are shown. The present invention may, however, be embodied in many different forms and should not be construed as limited to the exemplary embodiments set forth herein. Rather, these embodiments are provided so that this disclosure will be thorough and complete, and will fully convey the scope of the present invention to one of ordinary skill in the art.

Also, in the drawings, thicknesses or sizes of layers are exaggerated for convenience of explanation and clarity, and the same reference numerals denote the same elements. As used herein, the term "and/or" includes any and all combinations of one or more of the associated listed items.

The terminology used herein is for the purpose of describing particular embodiments only and is not intended to be limiting of exemplary embodiments of the present invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of exemplary embodiments.

A long metal fiber used herein which is obtained by fiberizing a metal such as stainless steel, aluminum, nickel, titanium, copper, or an alloy thereof refers to a metal thread having a diameter ranging from several micrometers ($\mu m$) to tens of $\mu m$ and a length equal to or greater than tens of $\mu m$. The long metal fiber has heat resistance, plasticity, and electrical conductivity like a metal, and also may be woven or nonwoven like a fiber. The present invention relates to an electrode structure of a battery using the advantages of the long metal fiber.

Such long metal fibers may be manufactured by maintaining a molten metal or alloy in a container and rapidly solidifying the molten metal or alloy by spraying the molten metal or alloy into the air through discharge holes in the container by using a pressure means such as a piston or a compressed gas. Alternatively, the long metal fibers may be manufactured by using a well-known bundle drawing method. Thicknesses, uniformity, a structure such as a nonwoven structure, and an aspect ratio of the long metal fibers may be controlled by controlling the number of the discharge holes, sizes of the discharge holes, and/or the flight of the molten metal. The long metal fibers constituting the battery may be manufactured as described above or may be manufactured by using any of other well-known methods without departing from the scope of the present invention.

When the term 'separator' is used herein, the separator includes a separator that is generally used in a liquid electrolyte battery using a liquid electrolyte having low affinity with the separator. Furthermore, when the separator used herein includes an intrinsic solid polymer electrolyte and/or a gel solid polymer electrolyte which is so strongly bound to the separator that the electrolyte and the separator are recognized as the same. Accordingly, the meaning of the separator has to be defined as described herein.

Figure 1:
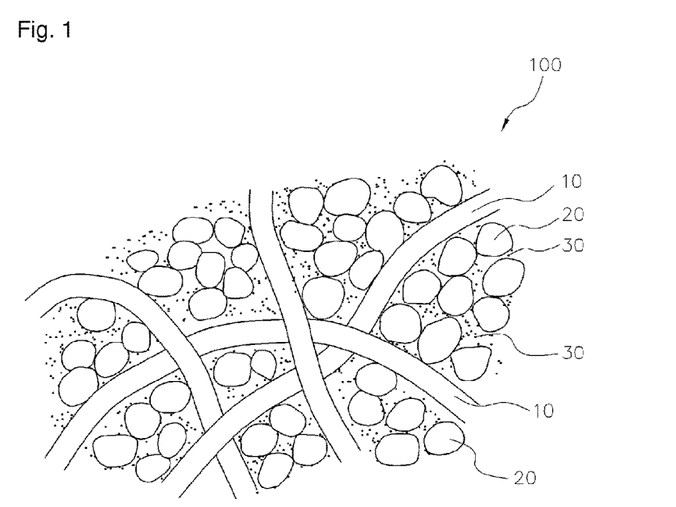
FIGS. 1 and 2 are views illustrating electrode structures according to embodiments of the present invention.
Figure 2:
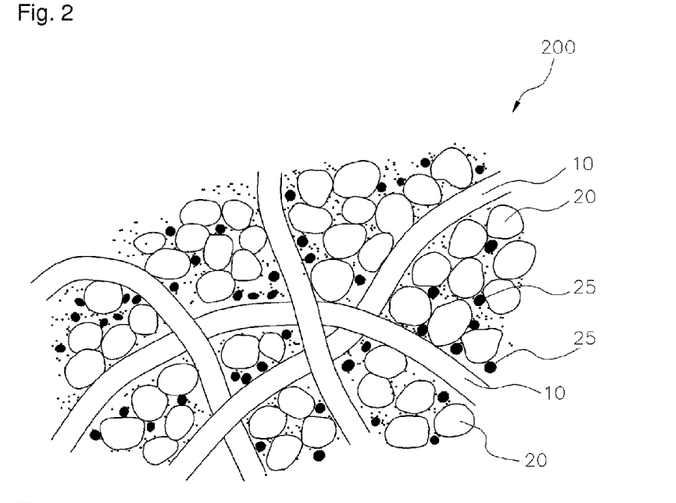

FIGS. 1 and 2 are views illustrating electrode structures 100 and 200 according to embodiments of the present invention.

Referring to FIG. 1, the electrode structure 100 includes one or more long metal fibers 10 and an electrically active material 20. The long metal fibers 10 may have plasticity due to ductility and malleability of a metal. Also, a plurality of the long metal fibers 10 each having an appropriate length may be provided by being segmented. The number and length of the long metal fibers 10 may be appropriately determined according to a size and capacity of a battery. For example, each of the long metal fibers 10 may have an aspect ratio of 25 to $10^6$ by having a thickness ranging from 1 $\mu m$ to 200 $\mu m$ and a length ranging from 5 mm to 1000 mm. Although the long metal fibers 10 have substantially linear and curved shapes in FIGS. 1 and 2, the present embodiment is not limited thereto and the long metal fibers 10 may have other regular or irregular shapes such as curled shapes or spiral shapes.

The long metal fibers 10 are electrically connected to one another by physically contacting or chemically bonded to one another to form one conductive network. The long metal fibers 10 may have a nonwoven structure in which the long metal fibers 10 are randomly arranged to be coupled to one another as shown in FIG. 1. The one or more long metal fibers 10 are curved, bent, and tangled with one another to have pores, thereby forming the conductive network which has mechanically solid low-electric resistance. The long metal fibers 10 may be formed of two or more different types of metals as desired. The chemical bonding may be achieved by forming an intermetallic compound between the different types of metals through an additional process such as thermal treatment, and thus the conductive network which is mechanically strengthened may be formed.

The electrically active material 20 may be mechanically bound in the conductive network. Sizes of pores formed by the long metal fibers 10 and porosity may be appropriately adjusted such that the electrically active material 20 is strongly bound to the conductive network. The sizes of the pores and the porosity may be adjusted by adjusting a mixture ratio by weight between the electrically active material 20 and the long metal fibers 10 in the electrode structure 100.

The mixture ratio by weight of the long metal fibers 10 in the electrode structure 100 may be adjusted by increasing the number or length of the long metal fibers 10. Alternatively, the sizes and of the pores in the electrode structure 100 and the porosity may be appropriately adjusted by mechanically compressing a mixture of the electrical active material 20 and the long metal fibers 10 having plasticity by using a pressure device such as a roll press as will be described below. Due to the mechanical compression, the electrode structure 100 may have a nonwoven structure, the conductive network may be mechanically strengthened, the electrically active material 20 may be strongly bound to the conductive network, and energy density of the battery may be improved.

The electrically active material 20 may be appropriately determined according to a polarity of the electrode structure 100 and whether the battery is a primary battery or a secondary battery. For example, the electrically active material 20 for a cathode may be selected from the group consisting of oxide, phosphate, sulfide, fluoride, each of which includes two or more components selected from lithium, nickel, cobalt, chromium, magnesium, strontium, vanadium, lanthanum, cerium, iron, cadmium, lead, and/or manganese, and a combination thereof. However, the present embodiment is not limited thereto, and the electrically active material 20 for a cathode may be formed of another chalcogen compound. Preferably, the electrically active material 20 for a cathode may be a lithium compound including three or more components, that is, a lithium compound including at least two of cobalt, copper, nickel, and manganese which are suitable for a lithium secondary battery and including at least one nonmetal element selected from the group consisting of oxygen (O), fluorine (F), sulfur (S), phosphorus (P), and a combination thereof.

The electrically active material 20 for an anode may be a carbon-based material, for example, a low-crystallized carbon-based material or a high-crystallized carbon-based material. The low-crystallized carbon may be, for example, soft carbon or hard carbon. The high-crystallized carbon may be high temperature baked carbon such as natural graphite, Kish graphite, pyrolytic carbon, mesophase pitch-based carbon fiber, meso-carbon microbeads, mesophase pitches, or petroleum or coal tar pitch-derived cokes.

However, the materials of the electrically active material 20 are exemplary, and the present embodiment is not limited thereto. The electrically active material 20 for an anode may include a single atom-based material such as silicon, geranium, tin, lead, antimony, bismuth, zinc, aluminum, iron, or cadmium which may absorb and emit high-capacity lithium ions, an intermetallic compound thereof, or an oxide-based material. Alternatively, the electrically active material 20 for an anode may include at least one of sodium or another oxide, carbide, nitride, sulfide, phosphide, selenium, and tellurium which are suitable for a NaS battery.

The electrically active material 20 may be provided as particles each having a size ranging from 0.1 μm to 100 μm. Preferably, the electrically active material 20 may have a size ranging from 5 μm to 15 μm. However, the present embodiment is not limited thereto and a size may be appropriately determined according to a use of the battery.

As shown in FIG. 2, when the electrically active material 20 is not a carbon-based material such as graphite particles, the electrode structure 200 may further include a conductor 25 that is bound in the conductive network along with the electrically active material 20. A weight of the conductor 25 may be about 4 to 15% with respect to a total weight of a mixture of the electrically active material 20 and the conductor 25. The conductor 25 may be fine carbon such as carbon black, ultrafine graphite particles, or acetylene black, a nano metal particle paste, or an indium tin oxide (ITO) paste.

If necessary, each of the electrode structures 100 and 200 may further include an appropriate binder (not shown) along with the electrically active material 20 and the conductor 25. The binder may be a polymer-based material such as vinylidene fluoride-hexafluoropropylene copolymer (PVDF-co-HFP), polyvinylidene fluoride (PVDF), polyacrylonitrile, polymethylmethacrylate, polytetrafluoroethylene (PTFE), styrenebutadiene rubber (SBR) or ethylene-propylene-diene copolymer (EPDM). If necessary, the binder may be, but is not limited to, another polymer-based material having conductivity such as petroleum pitch or coal tar.

The electrically active material 20 bound to the conductive network may form a sintered body through thermal treatment as will be described below. In this case, the electrically active material 20 may be further strongly bonded to the long metal fibers 10, and thus energy density of the battery may be further improved.

The long metal fibers 10 may include a metal such as stainless steel, aluminum, nickel, titanium, copper, or an alloy thereof. For example, in the case of a cathode, the long metal fibers 10 may include aluminum or an alloy thereof, and in the case of an anode, the long metal fibers 10 may include copper, stainless steel, nickel, or an alloy thereof. Each of the electrode structures 100 and 200 may be used for both an anode and a cathode in a battery, or may be selectively used for any one of an anode and a cathode.

In general, when the battery is a secondary battery, during charging/discharging, a volume of the electrically active material 20 is changed. For example, when the battery is a lithium-ion (Li-ion) battery, a volume of the electrically active material 20 for a high-capacity anode may be increased 100% or more during lithiation. Accordingly, during an electrochemical charge/discharge cycle, an anode is repeatedly expanded and contracted, and thus may be cracked. Due to the cracks, when the electrically active material 20 no longer electrically contacts a current collector, the battery may not be able to be charged or discharged or the risk of instability may be increased. However, according to the present embodiment, in an anode including the long metal fibers 10, since the long metal fibers 10 may be expanded and contracted as a volume of the electrically active material 20 is changed, cracks may be avoided. Also, the pores formed by the long metal fibers 10 and the electrically active material 20 may reduce a change in a volume of the electrically active material 20 during charging/discharging.

Since a change in a volume of the electrically active material 20 may be reduced, according to the present embodiment, the electrically active material 20 may include a metal-based compound or an intermetallic compound whose capacity is high and whose volume change is large such as silicon (Si), bismuth (Bi), tin (Sn), aluminum, or an alloy thereof which is considered as a next-generation high efficiency Li intercalation material for replacing petroleum coke carbon or graphite.

In order to address cracks in an electrode due to a change in a volume of an anode during charging/discharging, a nanoscale electrode structure which is less vulnerable to a change in volume or cracks, for example, as nanowires, nanotubes, or nanorods, have recently been suggested. However, the nanoscale electrode structure may be for a small battery and may not be applied to a high-capacity large battery, and requires a complex manufacturing process such as catalytic reaction. Also, in order to coat an electrically active material on the nanoscale electrode structure, a complex process such as vacuum deposition has to be performed. However, according to the present embodiment, since the long metal fibers 10 have mechanical and electrical advantages which a metal has and also have characteristics which a fiber has, the battery may be a medium or large battery having high capacity and may be manufactured at low costs by using a stacking or mixing process as will be described below.

Also, as described above, since the long metal fibers 10 have a mechanical strength, high conductivity, and thermal stability due to a high melting point, the long metal fibers 10 may have excellent current collection efficiency. Also, since the electrically active material 20 may be sintered, battery characteristics such as energy density of the battery may be improved. It would be understood by one of ordinary skill in the art from the aforementioned advantages that the present invention may be more efficiently applied to a battery which requires high capacity and high charge/discharge speed such as a battery for starting, lighting, and igniting (SLI) a vehicle, a battery for driving an electric vehicle and a hybrid vehicle, or a fixed battery for storing green energy.

Although not shown, an electrically active material may be pre-coated on surfaces of the long metal fibers 10. To this end, the long metal fibers 10 on which the electrically active material is pre-coated may be provided by dispersing in an appropriate solvent a mixed composition of appropriate electrically active material powder, a conductor, and a binder to obtain a resultant structure, coating the resultant structure on the long metal fibers 10, and removing the solvent by using a dry process. Assuming that the long metal fibers 10 on which the electrically active material is pre-coated are used, when an electrolytic solution is used, the long metal fibers 10 may be prevented from being corroded due to an electrolytic solution. The electrically active material which is to be pre-coated may be the same as the electrically active material 20 or a different type of active material having chemical affinity with the electrically active material 20. Alternatively, in order to prevent corrosion due to an electrolytic solution, the electrically active material to be pre-coated may include another metal or metal oxide coated body having corrosion resistance.

FIGS. 3A through 3D are views for explaining a method of manufacturing the electrode structure 100 or 200 of FIG. 1 or 2, according to an embodiment of the present invention.

Figure 3A:
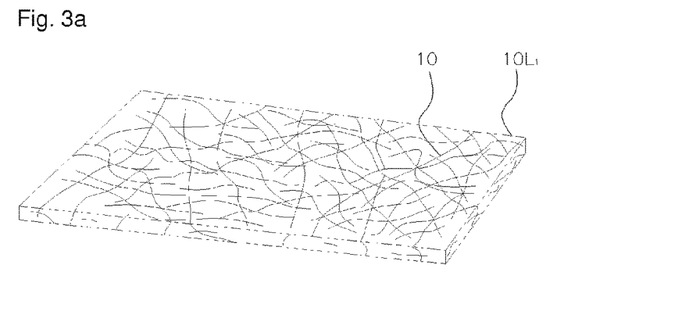
FIGS. 3A through 3D are views for explaining a method of manufacturing the electrode structure of FIG. 1 or 2, according to an embodiment of the present invention.

Referring to FIG. 3A, a first long fiber layer $10L_1$ including one or more long metal fibers 10 having plasticity is provided. For example, the first long fiber layer $10L_1$ may be formed by randomly arranging the long metal fibers 10 on an appropriate support plane. A thickness of the first long fiber layer $10L_1$ may be the same as a thickness of a single layer or several layers of the long metal fibers 10. The long metal fibers 10 in the first long fiber layer $10L_1$ may overlap with one another to physically contact one another. Selectively, the long metal fibers 10 may be chemically bonded to one another through appropriate thermal treatment. The thermal treatment may be performed at a temperature of, for example, 100° C. to 1200° C. The first long fiber layer $10L_1$ may be formed by using the long metal fibers 10 on which an electrically active material is uniformly pre-coated.

Figure 3B:
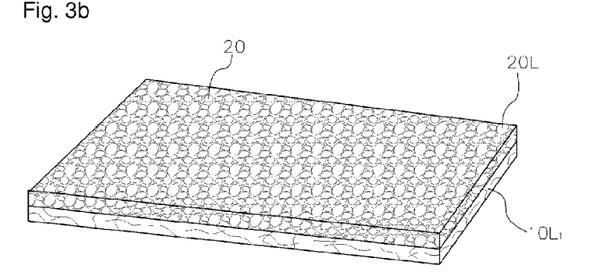

Referring to FIG. 3B, an electrically active material layer 20L is disposed on the first long fiber layer $10L_1$. The electrically active material layer 20L may be obtained by coating the electrically active material 20 on the first long fiber layer $10L_1$. The electrically active material 20 may be coated on the first long fiber layer $10L_1$ by applying or spraying to an appropriate thickness a paste, slurry, or an electrically active material-dispersed solution having a predetermined viscosity on the first long fiber layer $10L_1$ by using an appropriate solvent.

A conductor and/or a binder may be added to the electrically active material 20 as described above. In this case, the electrically active material 20 and the conductor and/or the binder may be mixed and coated on the first long fiber layer $10L_1$ in the form of a paste or slurry. The paste or slurry may include the electrically active material 20 in an amount of 80 to 98 wt %, the binder in an amount of 1 to 10 wt %, and the conductive material in an amount of 1 to 10 wt % based on 100 wt %.

Figure 3C:
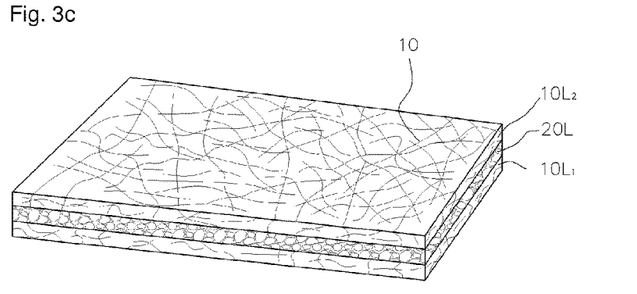

Referring to FIG. 3C, a second long fiber layer $10L_2$ is disposed on the electrically active material layer 20L. Like the first long fiber layer 10L1, the second long fiber layer $10L_2$ may be formed by randomly arranging the long metal fibers 10 on a surface of the electrically active material layer 20L. A thickness of the second long fiber layer $10L_2$ may be the same as a thickness of a single layer or several layers of the long metal fibers 10. The long metal fibers 10 in the second long fiber layer 10L may overlap with one another to physically contact one another, and selectively may be chemically bonded to one another through appropriate thermal treatment.

The second long fiber layer $10L_2$ may be formed by using the long metal fibers 10 on which an appropriate electrically active material is pre-coated.

Figure 3D:
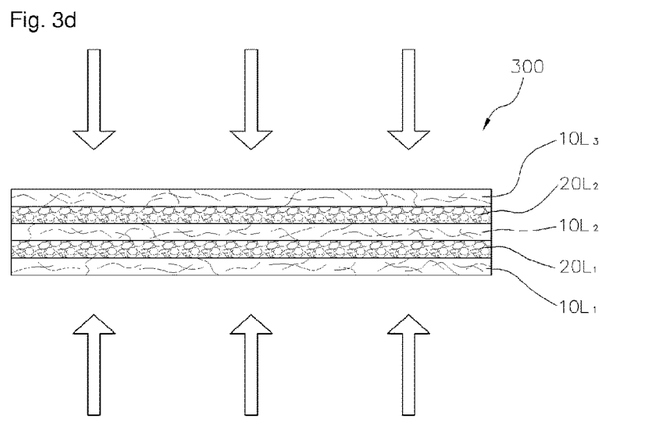

Processes described with reference to FIGS. 3A through 3C may be repeatedly performed. For example, as shown in FIG. 3D, a plurality of long fiber layers $10L_1$, $10L_2$, and $10L_3$ and electrically active material layers $20L_1$ and $20L_2$ may be alternately stacked. Although three long fiber layers $10L_1$, $10L_2$, and $10L_3$ and two electrically active material layers $20L_1$ and $20L_2$ are alternately stacked in FIG. 3D, the present embodiment is not limited thereto. For example, two long fiber layers and one electrically active material layer may be alternately stacked as shown in FIG. 3C, or four or more long fiber layers and three or more electrically active material layers may be alternately stacked.

As described above, after a structure 300 in which long fiber layers and electrically active material layers are stacked is formed, the structure 300 is compressed by using a pressure device such as a roll press. As shown in FIG. 3D, a surface of the structure 300 may be compressed in directions marked by arrows, and long fibers in adjacent long fiber layers, for example, in the first long fiber layer $10L_1$ and the second long fiber layer $10L_2$, and in the second long fiber layer $10L_2$ and the third long fiber layer $10L_3$ may be tangled with each other to physically contact each other, thereby forming a conductive network. During the compression, the long fibers in the different layers may be chemically bonded to each other by heating the stacked structure 300.

As such, the long metal fibers 10 included in a long fiber layer and the long metal fibers 10 included an adjacent long fiber layer physically contact each other and/or are chemically bonded to each other, to form a conductive network. The electrical active material 20 is bound to the conductive network, and the structure 300 has a nonwoven structure of the long metal fibers 10 to which the electrically active material 20 is bound as shown in FIGS. 1 and 2, like the electrode structure 100 or 200. The structure 300 is compressed to obtain a resultant structure having a planar shape with a predetermined thickness. Also, if necessary, the structure 300 may be hardened by performing heating, ultraviolet radiation, or natural drying.

Selectively, after the compression, the resultant structure may be thermally treated at a temperature ranging from 100° C. to 1200° C. During the thermal treatment, the electrically active material 20 in the long metal fibers 10 forming the conductive network is sintered, and thus the may be further strongly bound to the conductive network. An electrode may be activated by infiltrating an electrolytic solution (reference character 30 shown in FIG. 1) into pores in the conductive network of the structure 300.

Unlike in FIGS. 3A through 3D, an electrode composition may be formed by mixing long metal fibers which each have a predetermined length by being segmented with an electrically active material that is provided as particles. The electrically active material may be provided in the form of a paste or slurry. Also, a binder and/or a conductor may be further added to the electrode composition. Next, a conductive network in which the long metal fibers are randomly arranged and the electrode structure 100 or 200 may be obtained by hardening the electrode composition by using any of various methods such as natural drying, thermal hardening, and ultraviolet radiation. If necessary, thermal treatment may be performed to sinter the electrically active material. Next, a conductive tap or a lead for electrically connecting one surface of the electrode structure 100 or 200 to an external electrode terminal may be directly coupled to the electrode structure 100 or 200.

Figure 4A:
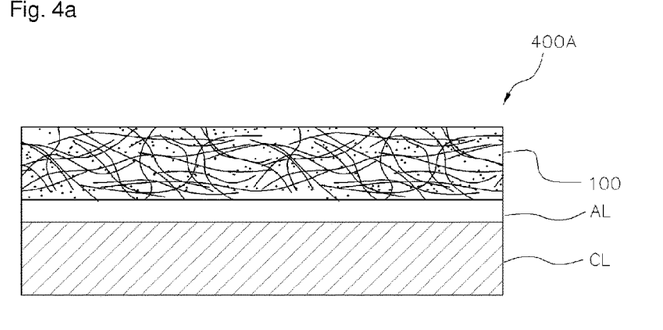
FIGS. 4A and 4B are cross-sectional views illustrating electrode structures according to other embodiments of the present invention.
Figure 4B:
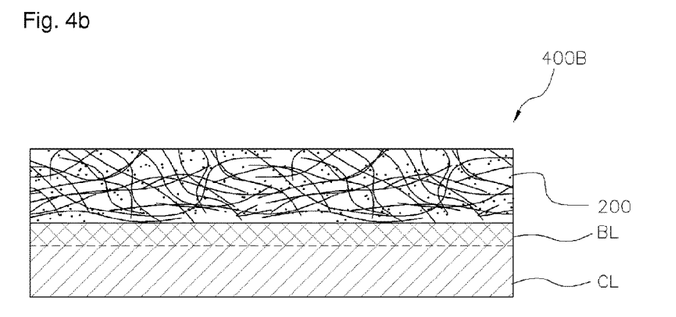

FIGS. 4A and 4B are cross-sectional views illustrating electrode structures 400A and 400B according to other embodiments of the present invention.

Referring to FIGS. 4A and 4B, electrode structures 400A and 400B according to other embodiments of the preset invention may be obtained by disposing conductive layers CL on surfaces of the electrode structures 100 and 200 having nonwoven structures obtained by using the afore-described method. Although the long metal fibers 10 in the electrode structures 100 and 200 having the nonwoven structures function as current collectors, the conductive layers CL may be additionally provided in order to reduce contact resistance with an electrode tap or lead in, for example, a process of assembling an electrode.

The conductive layer CL may be attached to the electrode structure 100 having the nonwoven structure by using a conductive adhesive layer AL, for example, a metal paste, as shown in FIG. 4A. Alternatively, the conductive layer CL may be bonded to the electrode structure 200 by using chemical bonding between the electrode structure 200 having the nonwoven structure and the conductive layer CL, or bonding layer BL or a reaction layer, as shown in FIG. 4B. The conductive layer CL may be a thin metal foil such as stainless steel, aluminum, or copper.

Figure 5:
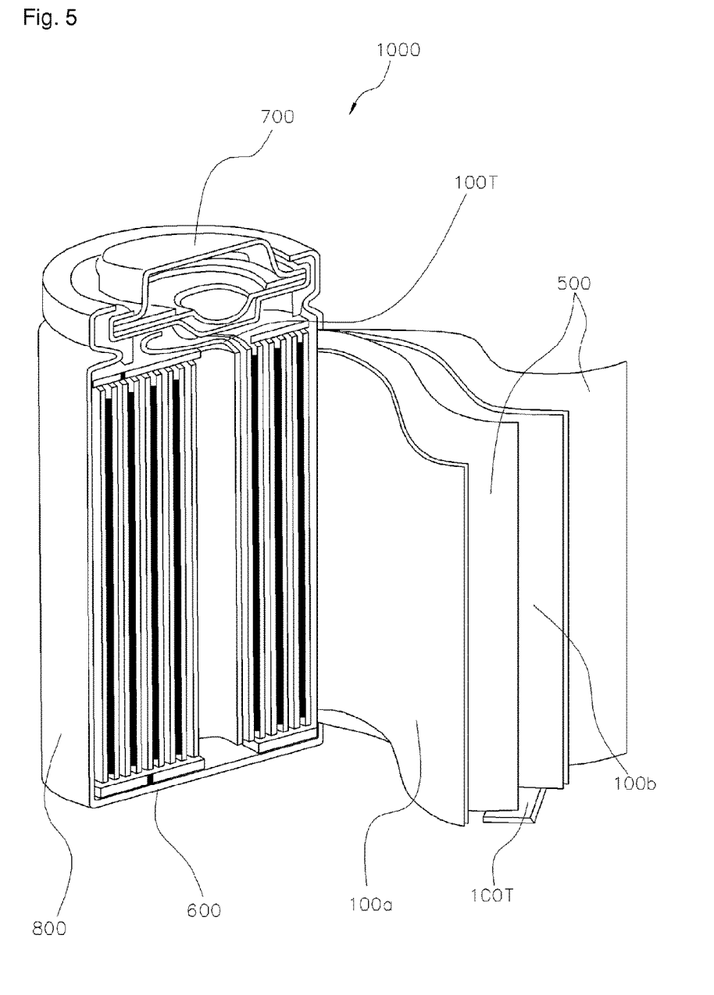
FIG. 5 is an exploded perspective view illustrating a battery using electrode structures, according to an embodiment of the present invention.

FIG. 5 is an exploded perspective view illustrating a battery 1000 using electrode structures 100a and 100b, according to an embodiment of the present invention.

Referring to FIG. 5, the battery 1000 is a general cylindrical battery. In order to increase a reaction area, the electrode structures 100a and 100b for a cathode and an anode may be alternately wound around each other. Conductive taps 100T may be respectively coupled to end portions of the electrode structures 100a and 100b. In order to insulate between the electrode structures 100a and 100b having different polarities, a separator 500 may be disposed between the electrode structures 100a and 100b.

The separator 500 may be, for example, a polymer-based microporous film, a woven fabric, a non-woven fabric, ceramic, an intrinsic solid polymer electrolyte film, a gel solid polymer electrolyte film, or a combination thereof. The intrinsic solid polymer electrolyte film may include, for example, a straight chain polymer material or a cross-linked polymer material. The gel polymer electrolyte film may be any one of a plasticizer-containing polymer, a filler-containing polymer, or a pure polymer including salt. The solid electrolyte layer may include, for example, a polymer matrix composed of any one of polyethylene, polypropylene, polyimide, polysulfone, polyurethane, polyvinyl chloride, polystyrene, polyethylene oxide, polypropylene oxide, polybutadiene, cellulose, carboxymethyl cellulose, nylon, polyacrylonitrile, polyvinylidene fluoride, polytetrafluoroethylene, a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polyethylacrylate, polymethylmethacrylate, polyethylmethacrylate, polybutylacrylate, polybutylmethacrylate, polyvinyl acetate, polyvinyl alcohol, and a combination thereof, an additive, and an electrolytic solution.

The materials of the separator 500 are exemplary, and any material that has an easily changeable shape, has a high mechanical strength, may not be broken or cracked even when the electrode structures 100a and 100b are deformed, has an arbitrary appropriate electron insulation, and excellent ion conductivity may be used.

The separator 500 may be a single or multi-layered film, and the multi-layered film may be a stack of single-layered films formed of the same material or a stack of single-layered films formed of different materials. For example, the stack may have a structure including a ceramic coating film on a surface of a polymer electrolyte film such as polyurefin. Considering durability, shut-down function, and stability of the battery 1000, a thickness of the separator 500 may range from 10 μm to 300 μm, preferably, from 10 μm to 40 μm, and more preferably, from 10 μm to 25 μm.

The battery 1000 is electrically connected to external electrode terminals 600 and 700 through the conductive taps 100T coupled to the electrode structures 100a and 100b. An aqueous electrolytic solution including salt such as potassium hydroxide (KOH), potassium bromide (KBr), potassium chloride (KCL), zinc chloride (ZnC12), or sulfuric acid ($H_2SO_4$) in a housing 800 may be infiltrated into the electrode structures 100a and 100b and/or the separator 500, thereby completing the battery 1000. Although not shown in FIG. 5, an appropriate battery management system for controlling stability and/or power supply characteristics while the battery 1000 is used may be additionally coupled.

INDUSTRIAL APPLICABILITY

Since shapes of the electrode structures are easily changed and volumes of the electrode structures may be adjusted in order to adjust a capacity of the battery. Also, since the shapes of the electrode structures including the long metal fibers are easily changed, the battery having any of various volumes and shapes, instead of a cylindrical battery, may be provided by three-dimensionally stacking, bending, or winding the electrode structures.

The battery may be used as a small battery by being attached to or integrated with clothes or bags, or may be used as a large or medium battery for vehicles or power storage by having high capacity.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A battery including an electrode structure, the electrode structure comprising:
    a conductive network formed by long metal fibers physically contacting or chemically bonded to one another;
    a first electrically active material that is impregnated into pores of the conductive network; and
    a pre-coated layer on surfaces of some or all of the long metal fibers;
    wherein the pre-coated layer has a second electrically active material different from the first electrically active material and having chemical affinity with the first electrically active material,
    wherein the metal fibers are randomly arranged to be tangled to each other to form the pores in the conductive network, and the first electrically active material is bound to the some or all of the long metal fibers by forming a sintered body through thermal treatment between the first electrically active material and second electrically active material having the chemical affinity with the first electrically active material.

2. The battery of claim 1, wherein the long metal fibers form a nonwoven structure in which the long metal fibers are randomly arranged to be coupled to one another.

3. The battery of claim 1, wherein the long metal fibers are formed of two or more different types of metals.

4. The battery of claim 1, wherein the electrode structure has a planar shape by being compressed, or a deformed shape by bending, winding, and/or stacking the planar shape.

5. The battery of claim 1, wherein each of the long metal fibers has a thickness ranging from 1 μm to 200 μm.

6. The battery of claim 1, wherein each of the long metal fibers has a length ranging from 5 mm to 1000 mm.

7. The battery of claim 1, wherein each of the long metal fibers comprises stainless steel, aluminum, nickel, titanium, copper, an alloy thereof, or a combination thereof.

8. The battery of claim 1, wherein the first electrically active material comprises an active material for a primary battery or a secondary battery.

9. The battery of claim 1, further comprising an electrolytic solution infiltrated into pores between the first electrically active material and the conductive network.

10. The battery of claim 1, wherein the first electrically active material and the second electrically active material each comprise an electrically active material for a cathode selected from the group consisting of oxide, phosphate, sulfide, and fluoride, each of which includes two or more components selected from lithium, nickel, cobalt, chromium, magnesium, strontium, vanadium, lanthanum, cerium, iron, cadmium, lead, and/or manganese.

* * * * *